US012233619B2

(12) United States Patent
Ghiotti et al.

(10) Patent No.: US 12,233,619 B2
(45) Date of Patent: Feb. 25, 2025

(54) MANUFACTURING MACHINE AND MANUFACTURING METHOD FOR THE PRODUCTION OF A TUBULAR ELEMENT, IN PARTICULAR FOR A SMOKING ARTICLE

(71) Applicant: SASIB S.P.A., Castel Maggiore (IT)

(72) Inventors: Roberto Ghiotti, Monte S. Pietro (IT); Enrico Manfredi, Bologna (IT); Yuri Negrini, Bologna (IT)

(73) Assignee: SASIB S.P.A., Castel Maggiore (IT)

( * ) Notice: Subject to any disclaimer, the term of this patent is extended or adjusted under 35 U.S.C. 154(b) by 94 days.

(21) Appl. No.: 17/798,000

(22) PCT Filed: Feb. 5, 2021

(86) PCT No.: PCT/IB2021/050957

§ 371 (c)(1),
(2) Date: Aug. 5, 2022

(87) PCT Pub. No.: WO2021/156816

PCT Pub. Date: Aug. 12, 2021

(65) Prior Publication Data

US 2023/0084810 A1 Mar. 16, 2023

(30) Foreign Application Priority Data

Feb. 7, 2020 (IT) ........................ 102020000002395

(51) Int. Cl.
*B31C 7/02* (2006.01)
*A24C 5/00* (2020.01)
*A24C 5/46* (2006.01)

(52) U.S. Cl.
CPC ................ *B31C 7/02* (2013.01); *A24C 5/002* (2013.01); *A24C 5/465* (2013.01)

(58) Field of Classification Search
CPC .. B31C 7/02; B31C 1/083; B31C 3/02; B31C 7/10; B31C 11/02; A24C 5/002;
(Continued)

(56) References Cited

U.S. PATENT DOCUMENTS 1,752,340 A 4/1930 Hohn
1,906,798 A 5/1933 Lerner
(Continued)

FOREIGN PATENT DOCUMENTS

CH 512892 A 9/1971
EP 1228709 B1 5/2004
(Continued)

OTHER PUBLICATIONS

European Patent Application No. 21710045.2, Communication Pursuant to Rule 114(2) EPC, dated Mar. 9, 2023.
(Continued)

*Primary Examiner* — Sameh Tawfik
(74) *Attorney, Agent, or Firm* — MARSHALL, GERSTEIN & BORUN LLP

(57) ABSTRACT

A manufacturing machine and a manufacturing method for the production of a tubular element, in particular for a smoking article. There are provided: an input conveyor, which moves at least one pocket along an input path; a wrapping conveyor, which moves at least one spindle, which has the shape of an inner cavity of the tubular element, along a wrapping path; a feeding station, where the pocket receives a wrapping sheet; and a transfer station, where the pocket releases the wrapping sheet to the spindle folding the wrapping sheet around the spindle into a "U" shape.

15 Claims, 11 Drawing Sheets

(58) Field of Classification Search

CPC .. A24C 5/465; A24C 5/06; A24C 5/10; A24C 5/18; A24C 5/46; A24C 5/54; A24C 5/605

USPC .......................................................... 493/296

See application file for complete search history.

(56) References Cited

U.S. PATENT DOCUMENTS

| | | | | |
|---|---|---|---|---|
| 2,035,211 | A | 3/1936 | Aivaz | |
| 3,250,186 | A * | 5/1966 | Frederick | B65D 41/44 493/107 |
| 3,307,561 | A | 3/1967 | Bernhard et al. | |
| 3,517,480 | A | 6/1970 | Pinkham | |
| 3,603,058 | A | 9/1971 | Schubert | |
| 3,828,658 | A | 8/1974 | Brodbeck et al. | |
| 4,036,119 | A | 7/1977 | Schubert et al. | |
| 4,158,989 | A * | 6/1979 | Barr | B31C 7/02 493/67 |
| 4,238,267 | A * | 12/1980 | Konstantin | B29C 66/542 156/499 |
| 4,398,904 | A * | 8/1983 | Fagerberg | B29C 53/60 493/299 |
| 4,452,596 | A * | 6/1984 | Clauss | B31F 1/0054 493/107 |
| 4,526,566 | A * | 7/1985 | Briand | B65H 75/50 493/287 |
| 5,393,292 | A * | 2/1995 | Sand | B31B 50/00 269/48.1 |
| 5,593,375 | A * | 1/1997 | Franci | B29C 53/50 493/276 |
| 6,682,469 | B1 * | 1/2004 | Knoerzer | B31B 70/88 493/320 |
| 8,939,187 | B2 | 1/2015 | Riethmueller et al. | |
| 10,709,169 | B1 * | 7/2020 | Richmond | A24C 5/44 |
| 2004/0235632 | A1 * | 11/2004 | Boldrini | B31B 50/64 493/51 |
| 2006/0037622 | A1 | 2/2006 | Bachmann | |
| 2006/0112963 | A1 | 6/2006 | Scott et al. | |
| 2008/0280743 | A1 | 11/2008 | Stahlecker et al. | |
| 2009/0098989 | A1 * | 4/2009 | Boldrini | B31B 50/84 229/125.14 |
| 2012/0145310 | A1 * | 6/2012 | Riethmueller | B65D 3/22 156/187 |
| 2014/0121087 | A1 * | 5/2014 | Stahlecker | B31D 5/0086 493/84 |
| 2014/0261470 | A1 | 9/2014 | Amiss et al. | |
| 2018/0289057 | A1 | 10/2018 | Ghiotti et al. | |
| 2019/0185195 | A1 * | 6/2019 | Busse | B31B 50/062 |
| 2019/0216127 | A1 | 7/2019 | Richmond et al. | |
| 2020/0015512 | A1 | 1/2020 | Stolarski | |
| 2021/0368857 | A1 * | 12/2021 | Sirani Fornasini | A24C 5/1807 |
| 2022/0354159 | A1 | 11/2022 | Mueller-Provenzano et al. | |
| 2023/0108165 | A1 * | 4/2023 | Ghiotti | A24C 5/465 493/269 |

FOREIGN PATENT DOCUMENTS

| | | | |
|---|---|---|---|
| FR | 3057441 | A1 | 4/2018 |
| GB | 311830 | A | 5/1929 |
| GB | 457063 | A | 11/1936 |
| GB | 688854 | A | 3/1953 |
| JP | 05138775 | A * | 6/1993 |
| WO | WO-2017/203255 | A1 | 11/2017 |

OTHER PUBLICATIONS

European Patent Application No. 21710046.0, Communication Pursuant to Rule 114(2) EPC, dated Mar. 9, 2023.

International Search Report and Written Opinion for Corresponding International Application No. PCT/IB2021/050957, mailing date May 18, 2021.

International Search Report and Written Opinion for Corresponding International Application No. PCT/IB2021/050959, mailing date May 18, 2021.

International Search Report and Written Opinion for Corresponding International Application No. PCT/IB2021/050960, mailing date Jun. 7, 2021.

Third Party Observations filed with the European Patent Office anonymously in European Patent Publication No. 4099852 (Applicant: SASIB SPA), on Nov. 26, 2023.

Communication Pursuant to Rule 114(2) EPC (Third Party Observation), European Application No. EP210710045.2 (Applicant Sasib SPA), dated Jan. 3, 2024.

* cited by examiner

MANUFACTURING MACHINE AND MANUFACTURING METHOD FOR THE PRODUCTION OF A TUBULAR ELEMENT, IN PARTICULAR FOR A SMOKING ARTICLE

CROSS-REFERENCE TO RELATED APPLICATIONS

This patent application is a U.S. national phase of International Patent Application No. PCT/IB2021/050957 filed Feb. 5, 2021, which claims the benefit of priority from Italian patent application no. 102020000002395 filed on Feb. 7, 2020, the respective disclosures of which are each incorporated herein by reference in their entireties.

TECHNICAL FIELD

The present invention relates to a manufacturing machine and a manufacturing method for the production of a tubular element.

The present invention finds advantageous application in the production of a tubular element, with the shape of a truncated cone, provided at one end with a filter which is subsequently used for the manual production of a cigarette.

PRIOR ART

Recently, the market for smoking articles proposed tubular elements with a truncated cone shape, which are partially empty and provided at one end with a filter, used for the manual production of a cigarette; in particular, a user no longer has to wrap a cigarette paper manually (a long and complex operation requiring good manual ability to obtain a result only just acceptable in quality), but must simply fill a preformed tubular element with tobacco through the open end.

However, to date, the production of these tubular elements of truncated cone shape and provided at one end with a filter is still carried out manually and therefore has very high production costs, does not allow high volumes, and results in a final product with a very variable and on average not very high quality.

U.S. Pat. No. 415,898A discloses a device for the production of containers and comprising: a rotating drum containing three paper punching machines capable of perforating the bottom of a circular container, and a conveyor system which moves a plurality of spindles; each spindle receives a bottom of a container from a respective rotating punch, and a clamp located on the spindle locks the edge of a pre-rubberised paper blank, which rotates around the spindle as it turns, pressing on the pre-rubberised paper blank to form a cup-shaped container on the spindle.

DESCRIPTION OF THE INVENTION

The object of the present invention is to provide a manufacturing machine and a manufacturing method for the production of a tubular element, in particular for a smoking article, which manufacturing machine and manufacturing method enable high productivity while ensuring high quality standards and are, at the same time, easy and inexpensive to implement.

In accordance with the present invention, a manufacturing machine and a manufacturing method are provided for the production of a tubular element, in particular for a smoking article, as claimed in the appended claims.

The claims describe preferred embodiments of the present invention forming an integral part of the present specification.

BRIEF DESCRIPTION OF THE DRAWINGS

The present invention will now be described with reference to the accompanying drawings, which illustrate a non-limiting embodiment thereof, wherein.

PREFERRED EMBODIMENTS OF THE INVENTION

Figure 1:
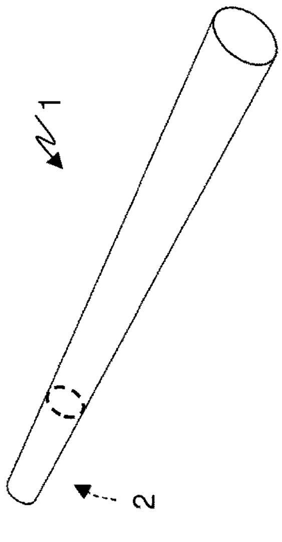
FIG. 1 is a perspective view of a tubular element with a truncated cone shape intended for the manual production of a cigarette.

Number 1 in FIG. 1 indicates, as a whole, a tubular element with a truncated cone shape, which is partially empty and provided at one (narrower) end with a filter 2. The tubular element 1 is intended for the manual production of a cigarette by being filled with tobacco through the open end.

The tubular element consists of a wrapping sheet 3 (shown extended in FIG. 2) of trapezoid shape, which is wrapped on itself into a tube until one end overlaps the other end; in particular, a permanent vinyl-based glue is interposed between the two overlapping ends and keeps the two overlapping ends joined together, thus stabilizing the tube-like folding of the wrapping sheet 3.

Figure 4:
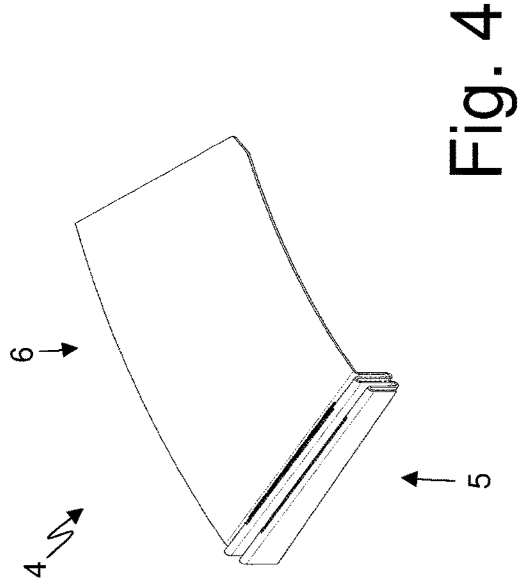
FIG. 4 is a perspective view of the tubular element in FIG. 3 partially folded back on itself.
Figure 3:
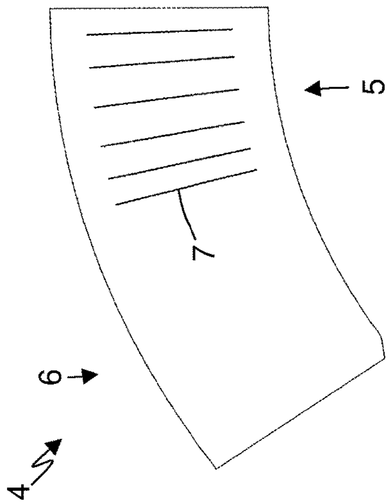
FIG. 3 is a plan view of an extended card stock sheet used to form a filter of the tubular element in FIG. 1.

According to a possible (but not limiting) embodiment shown in FIGS. 3 and 4, the filter 2 is formed by a card stock sheet 4 (which has a much higher weight than the wrapping sheet 3) that folds back on itself. In particular, the sheet 4 comprises an inner portion 5, which has a series of pre-weakened folding lines 7 and is folded like an accordion, or bellows (as shown in FIG. 4) along the pre-weakened folding lines 7 to form an inner body of the filter 2; moreover, the sheet 4 comprises an outer portion 6, which is contiguous to the inner portion 5 and is folded into a tube around the inner body consisting of the inner portion 5 folded like an accordion (as shown in FIG. 4) to form an outer wrapping of the filter 2.

Figure 5:
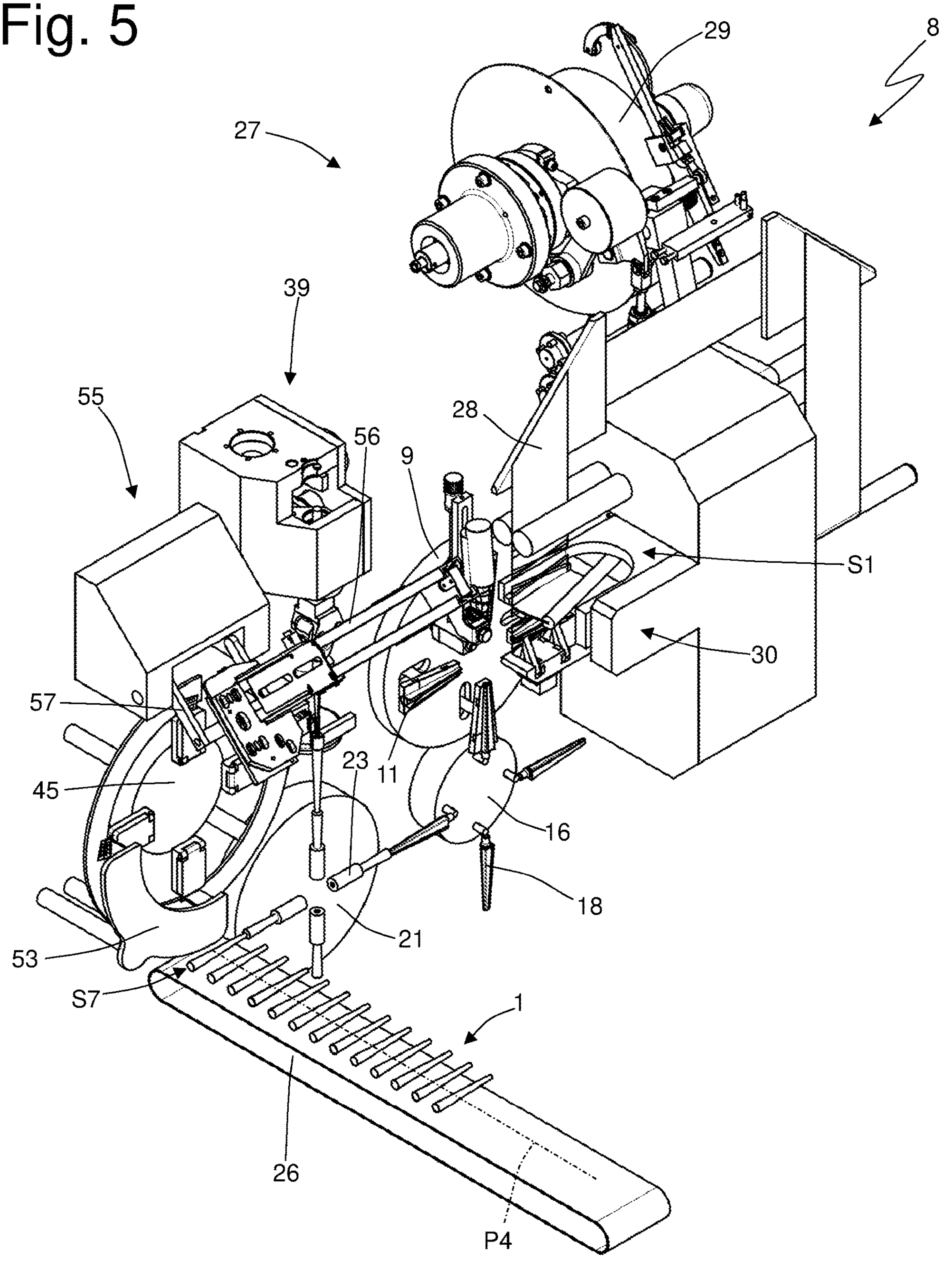
FIG. 5 is a perspective view, with parts removed for clarity, of a manufacturing machine that produces the tubular element of FIG. 1.

Number 8 in FIG. 5 indicates, as a whole, a manufacturing machine (only partially shown) for the production of the above-described tubular elements 1. The manufacturing machine 8 has an intermittent motion, i.e., its conveyors cyclically alternate movement phases and rest phases.

Figure 6:
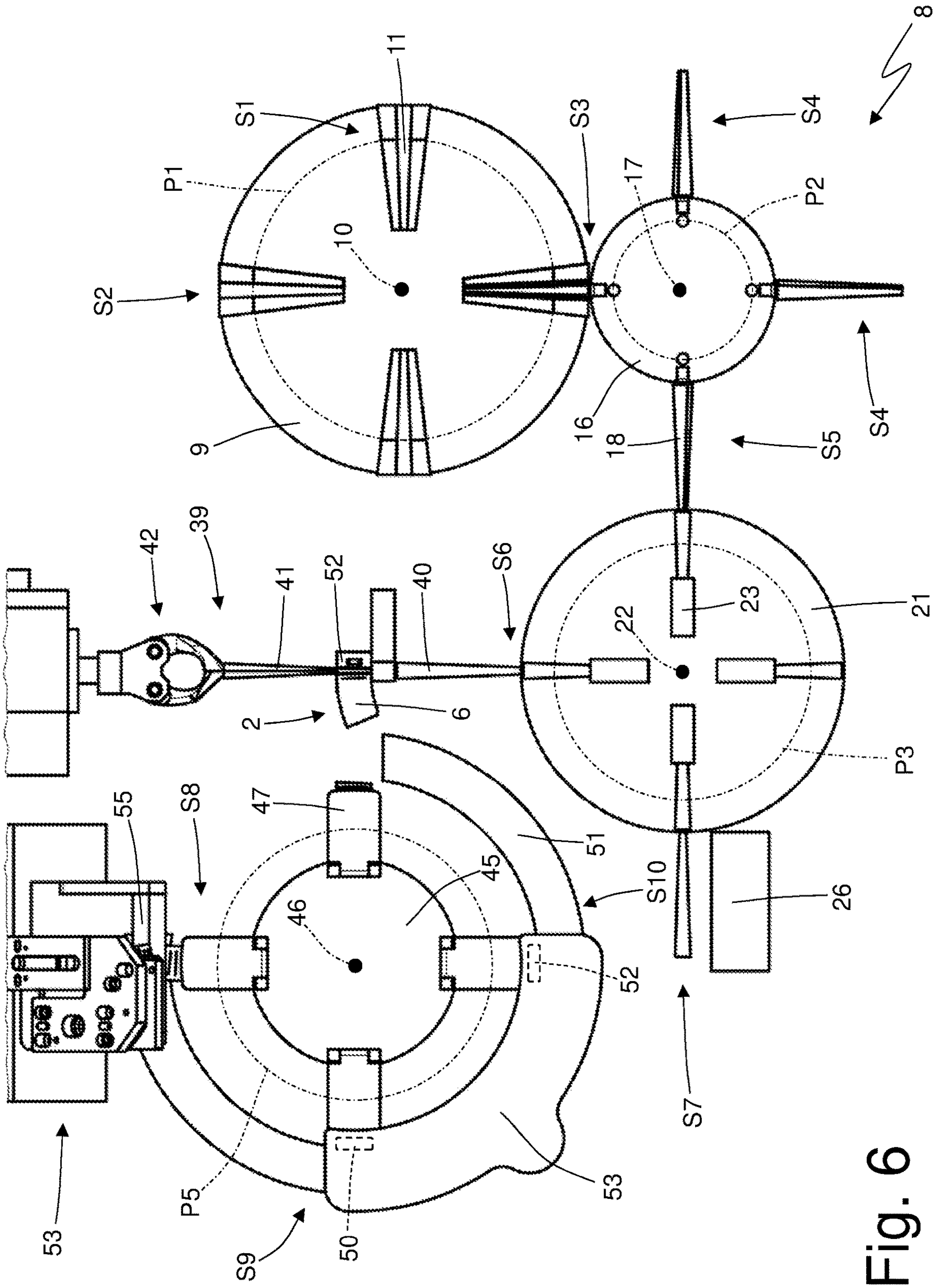
FIG. 6 is a front view of a part of the manufacturing machine in FIG. 5.

As shown in FIG. 6, the manufacturing machine 8 comprises an input drum 9, which is arranged vertically and is mounted so as to rotate, in a stepped manner, around a horizontal rotation axis 10 (perpendicular to the plane of FIG. 6); in other words, the input drum 9 is driven into rotation with an intermittent motion, i.e., a non-continuous motion comprising a cyclic alternation of motion phases, in which the input drum 9 is in motion, and rest phases, in which the input drum 9 is still. The input drum 9 supports four pockets 11, each suited for receiving a corresponding wrapping sheet 3; according to a different embodiment, not shown, the input drum 9 supports a different number of pockets 11, for example, three, five, six, eight . . . pockets 11.

Figure 8:
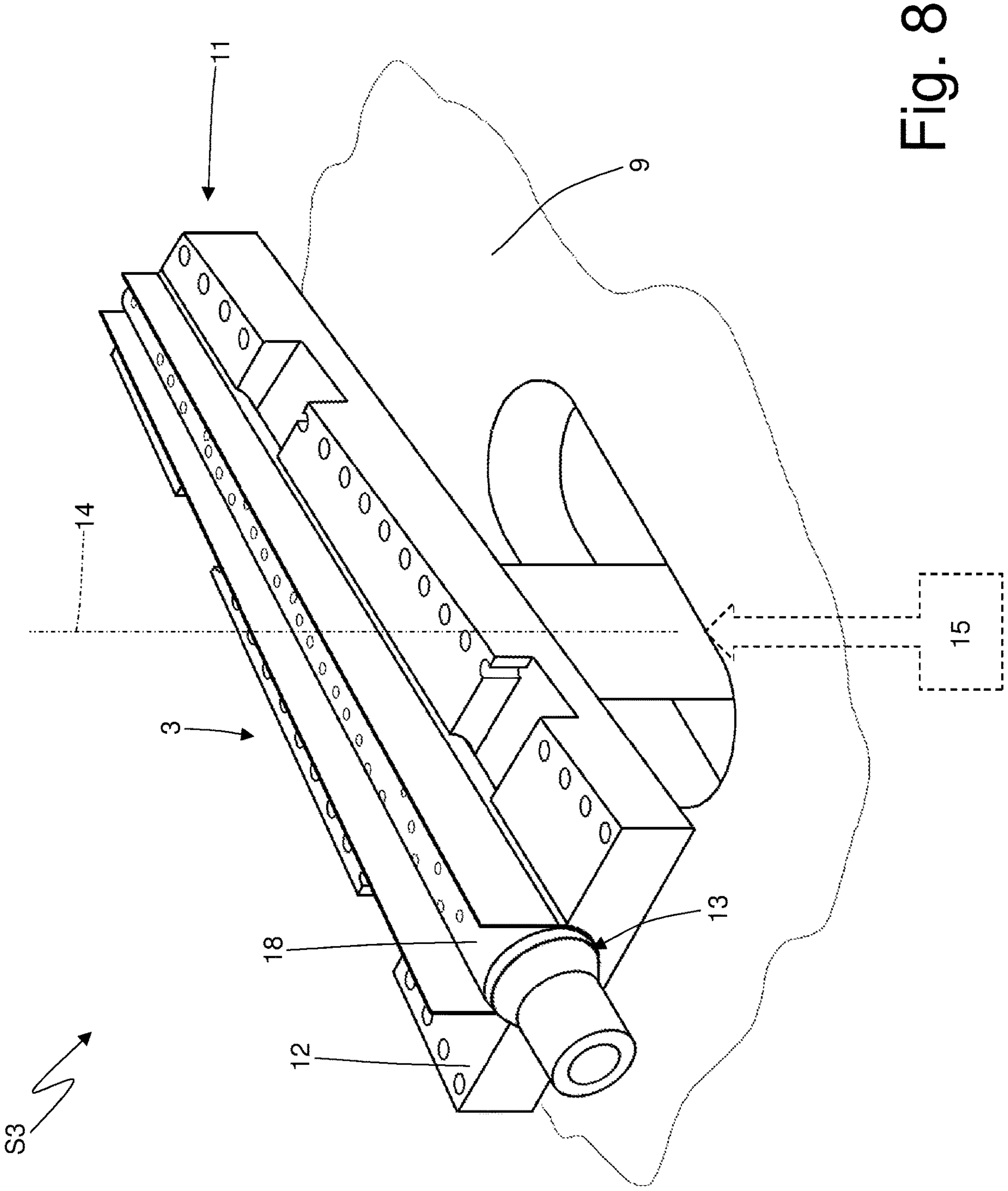
FIG. 8 is a perspective view, on an enlarged scale, of a pocket and a spindle of the manufacturing machine in FIG. 5.

As shown in FIG. 8, each pocket 11 has a truncated-cone-shaped holding wall 12, which reproduces the shape of the wrapping sheets 3 and is designed to hold a corresponding wrapping sheet 3 through suction; that is, the holding wall 12 of each pocket 11 has a plurality of small holes, which can be connected to a suction source, so as to hold a corresponding wrapping sheet 3, and can optionally be connected to a compressed air source in order to push a corresponding wrapping sheet 3 away. In addition, the holding wall 12 of each pocket 11 has, at the centre, a groove 13, which reproduces in negative the shape of a tubular element 11. Each pocket 11 is mounted on the input drum 9 in a movable manner, both for rotating, relative to the input drum 9, around a rotation axis 14 parallel to the rotation axis 10, and for axially translating, relative to the input drum 9, along the rotation axis 14 between a raised exchange position, in which the pocket 11 receives and releases a corresponding wrapping sheet 3, and a lowered movement position; in particular, in the exchange position, each pocket 11 is (axially) farther from the input drum 9, whereas in the movement position, each pocket 11 is (axially) closer to the input drum 9. The movement of the pockets 11 relative to the input drum 9 is generated by an actuator 15 (schematically shown in FIG. 8), which uses fixed cams arranged inside the input drum 9 and/or electric motors carried by the input drum 9.

As shown in FIG. 6, the rotation of the input drum 9 around the rotation axis 10 cyclically moves each pocket 11 along a circular input path P1 through: a feeding station S1 where the pocket 11 receives a wrapping sheet 3; a gluing station S2 where the wrapping sheet 3 carried by the pocket 11 is glued (i.e., provided with glue), and a transfer station S3 where the wrapping sheet 3 is released and leaves the pocket 11.

As shown in FIG. 6, the manufacturing machine 8 comprises a wrapping drum 16, which is arranged vertically and is mounted so as to rotate, in a stepped manner, around a horizontal rotation axis 17 (parallel to the rotation axis 9); in other words, the wrapping drum 16 is driven into rotation with an intermittent motion, i.e., a non-continuous motion comprising a cyclic alternation of motion phases, in which the wrapping drum 16 is in motion, and rest phases, in which the wrapping drum 16 is still. The wrapping drum 16 supports four spindles 18, each having the shape of the inner cavity of the tubular elements 1 and suited for receiving a corresponding wrapping sheet 3, which is wrapped into a tube around the spindle 18; according to a different embodiment, not shown, the wrapping drum 16 supports a different number of spindles 18, for example, three, five, six, eight . . . spindles 18.

Figure 9:
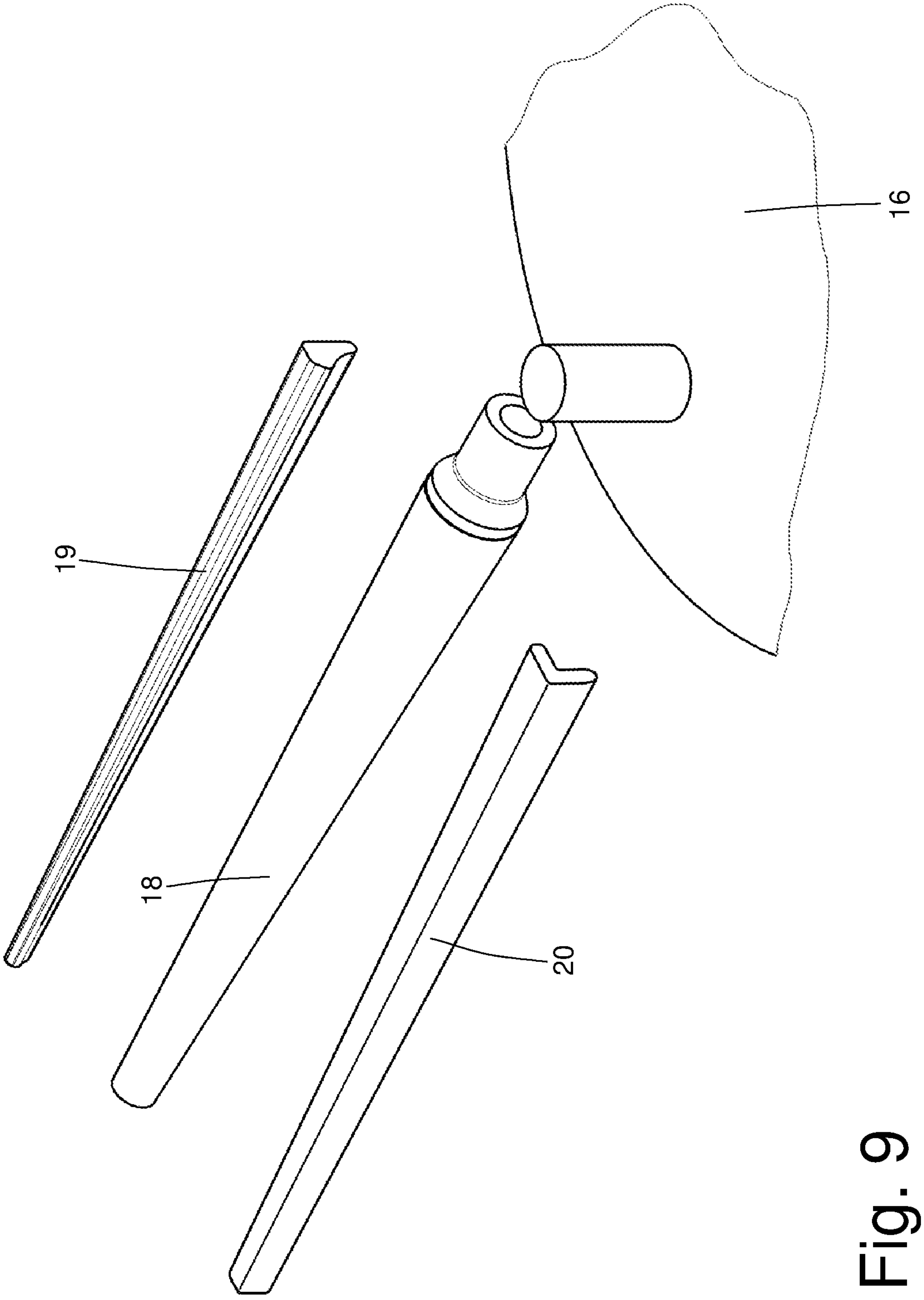
FIG. 9 is a perspective view, with parts removed for clarity, of a spindle of the manufacturing machine in FIG. 5.

As shown in FIG. 8, each spindle 18 is designed to hold a corresponding wrapping sheet 3 through suction; that is, an outer wall of each spindle 18 has a plurality of small holes, which can be connected to a suction source, so as to hold a corresponding wrapping sheet 3, and can optionally be connected to a compressed air source in order to push a corresponding wrapping sheet 3 away. According to a possible embodiment, the small holes of each spindle 18 are inclined towards the smaller base of the spindle 18 (i.e., towards the narrower end of the spindle 18); in this way, when the small holes of each spindle 18 are fed with compressed air, they also generate an axial thrust which tends (helps) to remove a tubular element 1 from the spindle 18. As shown in FIG. 9, each spindle 18 is coupled to two folding elements 19 and 20, which move together with the spindle 18 along the wrapping path P2, are arranged on opposite sides of the spindle 18 (that is, the folding element 19 is arranged to the right of the spindle 18, whereas the folding element 20 is arranged to the left of the spindle 18) and are movable independently of one another relative to the spindle 18 so as to move between a waiting position, in which the folding elements 19 and 20 are farther from the spindle 18 (and do not touch the wrapping sheet 3), and a folding position, in which the folding elements 19 and 20 are substantially in contact with the spindle 18 (and fold the wrapping sheet 3 around the spindle 18). According to a preferred embodiment shown in FIG. 9, both the folding elements 19 and 20 have a truncated cone shape. Furthermore, still in accordance with the embodiment shown in FIG. 9, both the folding elements 19 and 20 have an L-shaped cross-section.

As shown in FIG. 6, the rotation of the wrapping drum 16 around the rotation axis 17 cyclically moves each spindle 18 along a circular wrapping path P2 through: the transfer station S3 where the spindle 18 receives, from a pocket 11 of the input drum 9, a wrapping sheet 3 which is wrapped into a tube around the spindle 18 (as shown in FIG. 8), two stabilization stations S4 where the glue applied to the wrapping sheet 3 sticks, thus stabilizing the tubular shape of the wrapping sheet 3, and a transfer station S5 where the tubular wrapping sheet 3 is released and leaves the spindle 18.

As shown in FIG. 6, the manufacturing machine 8 comprises an insertion drum 21, which is arranged vertically and is mounted so as to rotate, in a stepped manner, around a horizontal rotation axis 22 (parallel to the rotation axis 17); in other words, the insertion drum 21 is driven into rotation with an intermittent motion, i.e., a non-continuous motion comprising a cyclic alternation of motion phases, in which the insertion drum 21 is in motion, and rest phases, in which the insertion drum 21 is still. The insertion drum 21 supports four pockets 23, each of which has a tubular shape and has, on the inside, a truncated-cone-shaped seat 24 (visible in FIGS. 10, 11 and 12), which reproduces in negative the shape of the tubular elements 1 and is designed to receive a corresponding tubular element 1; according to a different embodiment, not shown, the insertion drum 21 supports a different number of pockets 23, for example three, five, six, eight . . . pockets 23.

Each pocket 23 is designed to hold a corresponding tubular element 1 through suction; that is, an inner wall of each pocket 23 (which delimits the seat 24) has a plurality of small holes, which can be connected to a suction source, so as to hold a corresponding tubular element 1, and can optionally be connected to a compressed air source in order to push a corresponding tubular element 1 away. According to a possible embodiment, the small holes of each pocket 23 are inclined towards the larger base of the seat 24 (i.e., towards the wider end of the seat 24); in this way, when the small holes of each pocket 23 are fed with compressed air, they also generate an axial thrust which tends (helps) to remove a tubular element 1 from the pocket 23. Each pocket 23 is mounted on the insertion drum 21 in a movable manner so as to radially translate, relative to the insertion drum 21, between an expanded exchange position (shown in FIG. 12), in which the pocket 23 receives and releases a corresponding tubular element 1, and a contracted movement position (shown in FIG. 10); in particular, in the exchange position (shown in FIG. 12), each pocket 23 is (radially) farther from the insertion drum 21, whereas in the movement position (shown in FIG. 10), each pocket 23 is (radially) closer to the insertion drum 21. It is important to emphasize that all the pockets 23 always radially translate together and in the same way, that is, all the pockets 23 perform the same radial translation in a synchronized manner. The movement of the pockets 23 relative to the insertion drum 21 is generated by an actuator 25 (schematically shown in FIGS. 10, 11 and 12), which uses fixed cams arranged inside the insertion drum 21 and/or electric motors carried by the insertion drum 21.

As shown in FIG. 6, the rotation of the insertion drum 21 around the rotation axis 22 cyclically moves each pocket 23 along a circular insertion path P3 through: the transfer station S5 where the pocket 23 receives a tubular element 1 from a spindle 18 of the wrapping drum 16, an insertion station S6 where a filter 2 is inserted into the tubular element 1, and a transfer station S7 where the tubular element 1 is released and leaves the pocket 23.

As shown in FIG. 5, the manufacturing machine 8 comprises a linear output conveyor 26, which receives the tubular elements 1 provided with the filters 2 in the transfer station S7 from the pockets 23 of the insertion drum 21 and moves the tubular elements 1 provided with the filters 2 along a linear output path P4. According to a preferred embodiment, the output conveyor 26 is a belt conveyor and comprises a conveyor belt which is closed in a loop around two end pulleys. When a pocket 23 of the insertion drum 21 is stationary in the transfer station S7 and is in the expanded exchange position, the pocket 23 is exactly above the output conveyor 26 so as to leave, above the output conveyor 26, a tubular element 1 contained in the seat 24 of the pocket 23.

Figure 2:
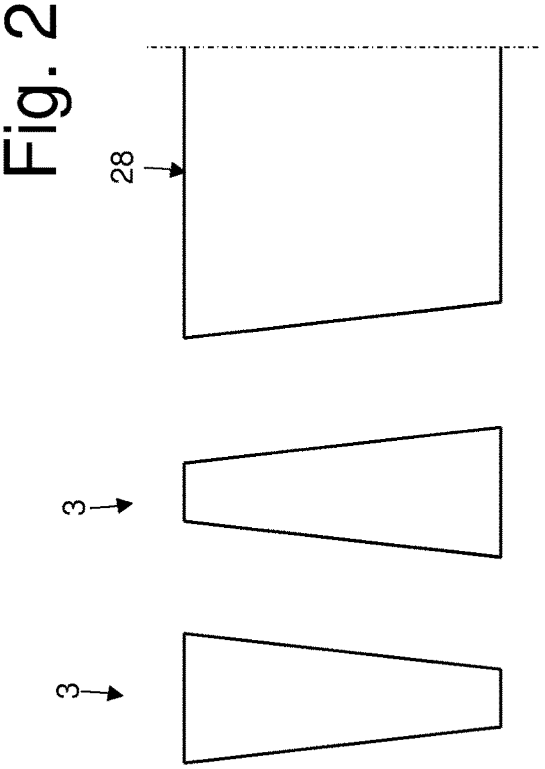
FIG. 2 is a plan view of wrapping sheets used to form the tubular element in FIG. 1.
Figure 7:
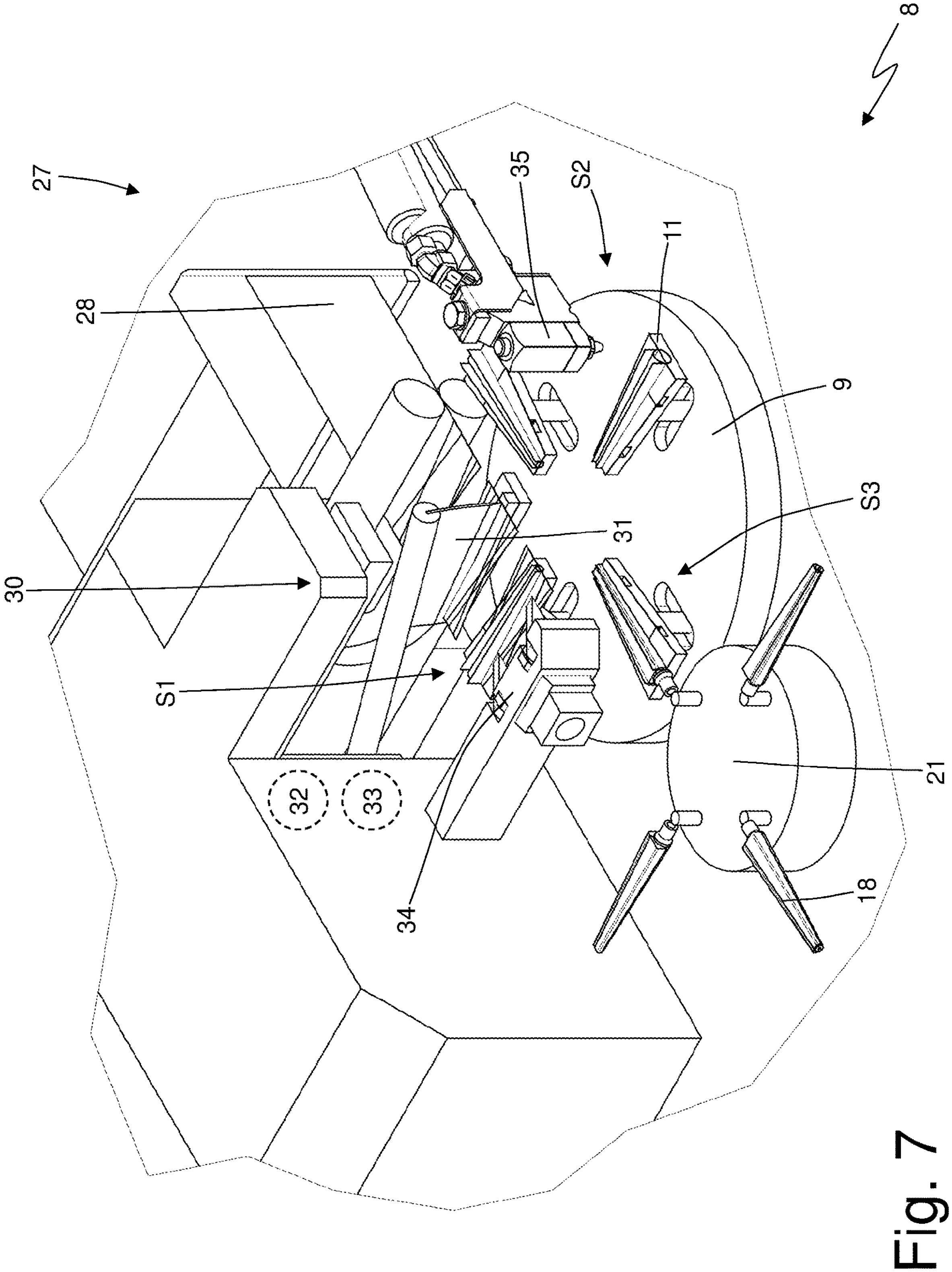
FIG. 7 is a perspective view, with parts removed for clarity, of a part of the manufacturing machine in FIG. 5.
Figure 10:
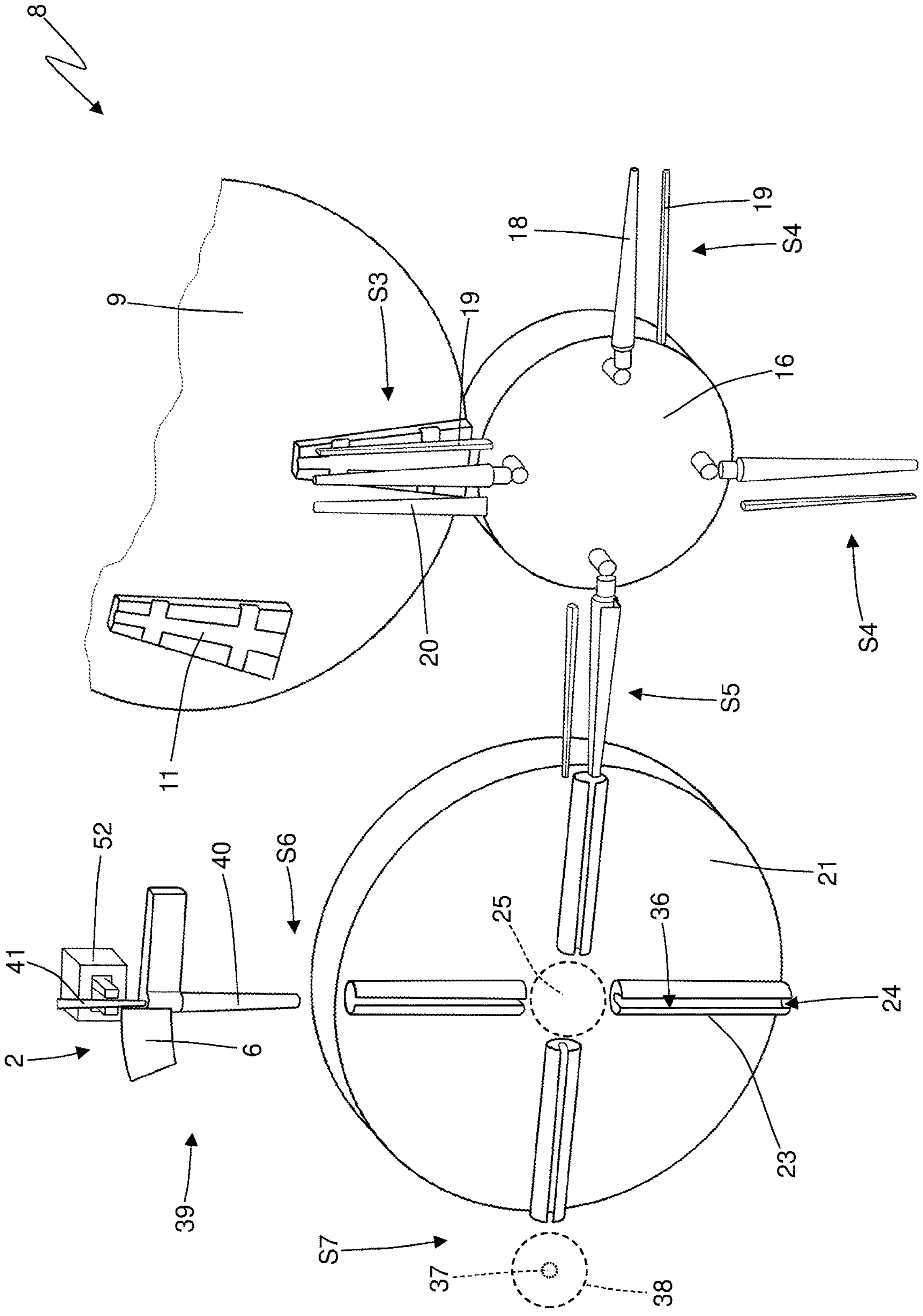
FIGS. 10, 11 and 12 are three perspective views, with parts removed for clarity, of a different part of the manufacturing machine in FIG. 5, in three different moments of operation.
Figure 11:
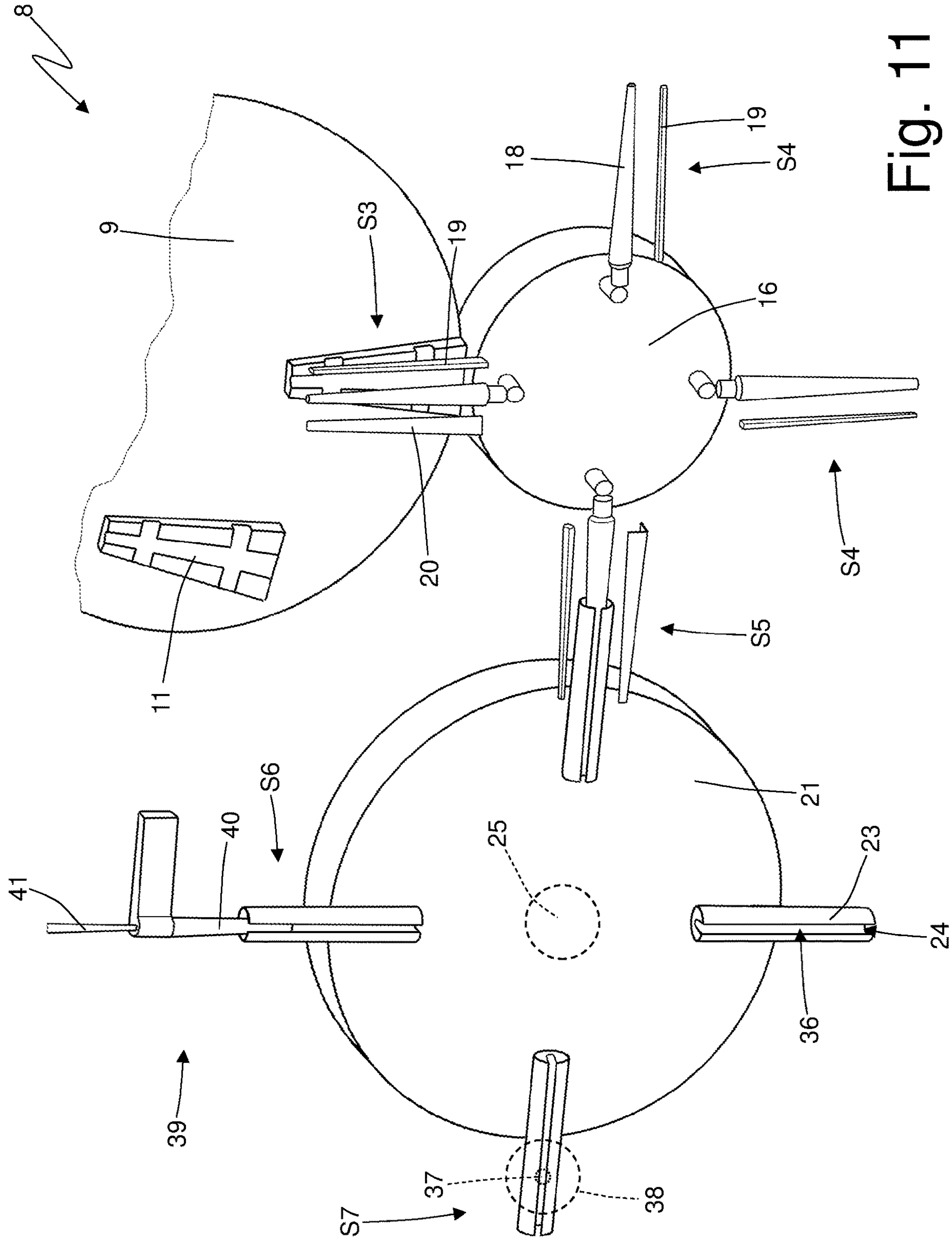
Figure 12:
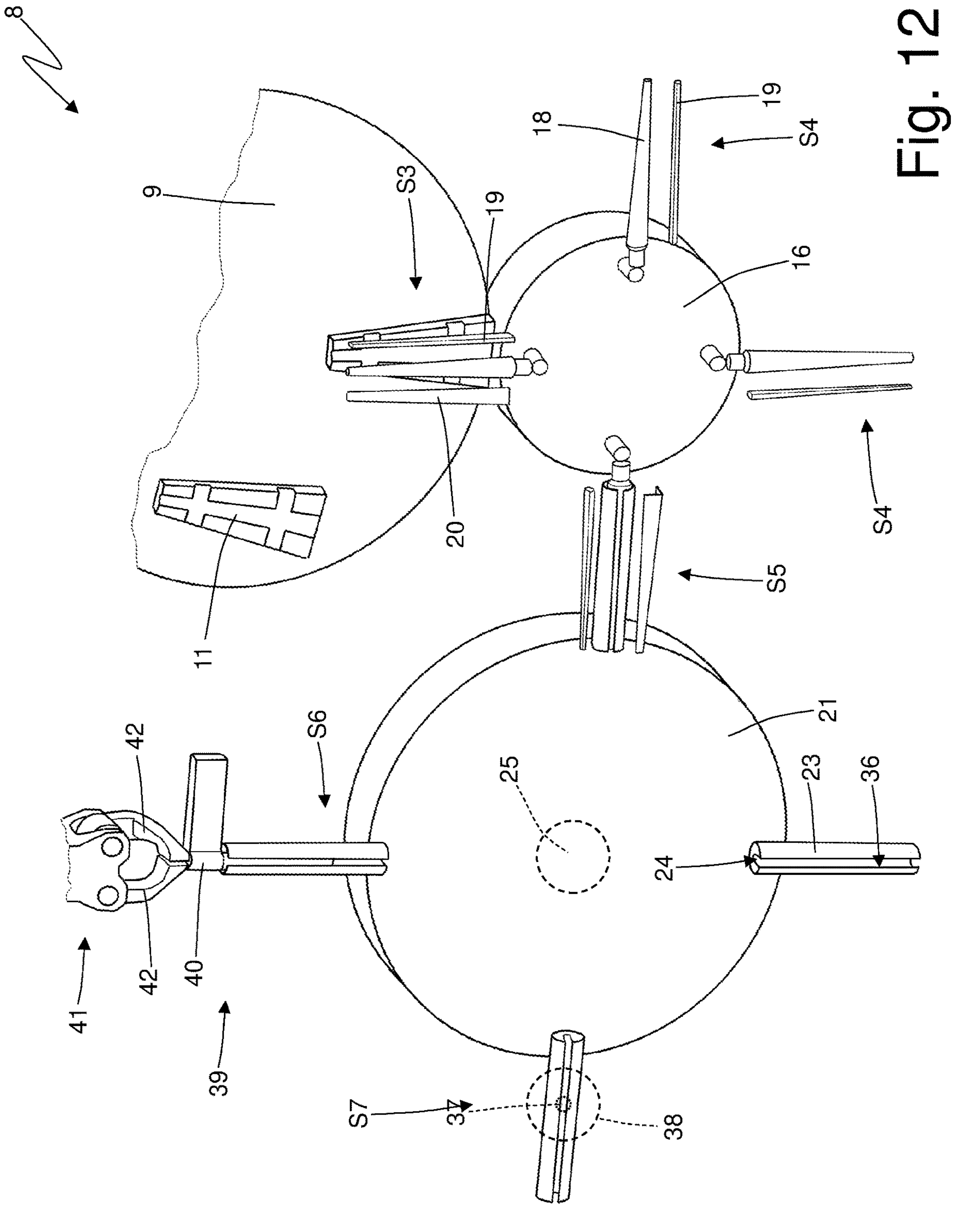

With particular reference to FIGS. 10-12, the insertion drum 21 supports four pockets 23, which are moved along a circular insertion path P3 which passes through the three above-described stations S5, S6, S7: in detail, at each step, there will be a pocket 23 in the area of the transfer station S5, a pocket 23 in the area of the insertion station S6, a pocket 23 in the area of the transfer station S7, and a last pocket 23 in an operating position (i.e., in which no particular operation is performed). The fact that all the pockets 23 always radially translate together and in the same way (FIGS. 10-12), as described in detail above, advantageously allows different operations to be performed simultaneously at each pocket 23. It is understood that the number of pockets may vary with respect to what is shown, as may the number of stations arranged along the path P3. As shown in FIG. 5, the manufacturing machine 8 comprises a feeding system 27 which unwinds a paper band 28 from a reel 29 and moves the band 28 towards the feeding station S1. As shown in FIG. 7, the feeding station S1 comprises a cutting device 30, which cyclically cuts the paper band 28 transversely in order to separate a succession of wrapping sheets 3 from the paper band 28. The cutting device 30 comprises a knife 31 which, in order to cut the paper band 28, is cyclically moved perpendicularly to the paper band 28 by an actuator 32. Moreover, the cutting device 30 comprises a further actuator 33, which, between one cut and the other, changes the inclination of the knife 31 relative to the paper band 28 (i.e., rotates the knife 31 around a rotation axis perpendicular to the lying plane of the paper band 28) so as to cyclically alternate the cutting direction; in this way, a succession of truncated-cone-shaped wrapping sheets 3 can be separated from the rectangular paper band 28 without producing swarf (i.e., residual waste from the paper band 28 after cutting), as shown in FIG. 2. The cutting device 30 comprises a gripping member 34, which is arranged in the area of the knife 31, is designed to grip one edge of a wrapping sheet 3, while the wrapping sheet 3 is being separated from the paper band 28 by the action of the knife 31, and is designed to translate the wrapping sheet 3, now separated from the paper band 28, over a pocket 11 located in the feeding station S1. Preferably, the gripping member 34 is movable so as to translate back and forth between the knife 31 and the pocket 11 located in the feeding station S1 and is provided with a pair of tweezers for grasping and holding a wrapping sheet 3.

The gluing station S2 comprises a spray gluing device 35 (i.e., equipped with gluing nozzles), which applies glue to a wrapping sheet 3 carried by the pocket 11 when the pocket 11 passes through the gluing station S2. According to a preferred embodiment, the gluing station S2 is arranged in an area of the input drum 9 where the pockets 11 do not stop, so that the pockets 11 are always moving when they pass through the gluing station S2; i.e., the pockets 11 do not stop in the gluing station S2 but are always in motion when they pass through the gluing station S2. While passing through the gluing station S2, the pockets 11 rotate around the corresponding rotation axes 14 and relative to the input drum 9, so that the glue sprayed by the gluing device 35 is deposited along one edge of each wrapping sheet 3; that is, the law of motion followed by the pockets 11 as they pass through the gluing station S2 (and determined by the composition of the rotation of the input drum 9 around the rotation axis 10 and the simultaneous rotation of the pockets 11 around the corresponding rotation axes 14) is such that the glue sprayed by the gluing device 35 is deposited along one edge of each wrapping sheet 3.

As shown in FIGS. 10, 11 and 12, each tubular pocket 23 has a slit 36, which leads into the seat 24; moreover, at the transfer station S7 there is a removing tooth 37, which is mounted in a movable manner so as to translate parallel to the rotation axis 22 under the control of a linear actuator 38. In the transfer station S7, when the tubular pocket 23 moves from the contracted position to the expanded position (in which the tubular pocket 23 is immediately above the output conveyor 26), the actuator 38 keeps the removing tooth 37 on the outside of the slit 36 (and therefore of the seat 24); instead, in the transfer station S7, when the tubular pocket 23 moves from the expanded position to the contracted position, the actuator 38 moves the removing tooth 37 into the slit 36 and into the seat 24, so as to press against one end of the tubular element 1 (in the area of the filter 2 where the tubular element 1 is more robust) and therefore cause the tubular element 1 (which remains stationary due to the action of the removing tooth 37) to be removed from the seat 24 of the tubular pocket 23 (which radially translates from the expanded position to the contracted position).

Figure 13:
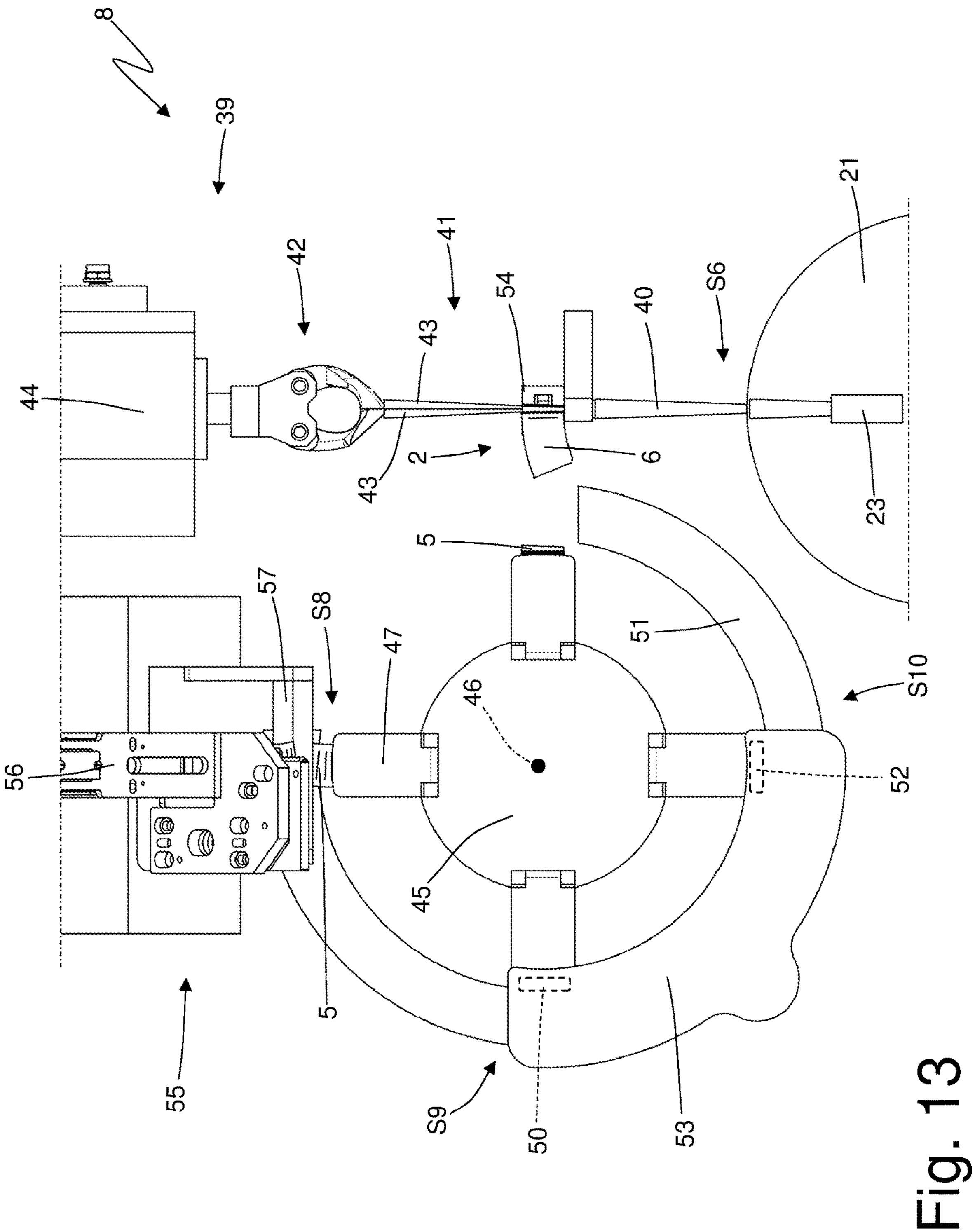
FIG. 13 is a front view, with parts removed for clarity, of a further part of the manufacturing machine in FIG. 5.

As shown in FIG. 13, an inserting device 39 is arranged in the insertion station S6 and is designed to insert a filter 2 into a tubular element 1 carried by a pocket 23, which is substantially stationary at the insertion station S6. The inserting device 39 comprises a tubular inserting body 40 with the shape of a truncated cone, which is suited to be inserted into a tubular element 1 and therefore to receive, on the inside, a filter 2 which is pushed along the entire inserting body 40 until it comes out of the inserting body 40, so as to be inserted into the tubular element 1 surrounding the inserting body 40. In other words, the inserting body 40 is arranged inside the tubular element 1, so that a wider (larger) input end of the inserting body 40 is arranged at the wider (larger) end of the tubular element 1, and a narrower (smaller) output end of the inserting body 40 is arranged inside the tubular element 1 and in proximity to the narrower (smaller) end of the tubular element 1 (i.e., where the filter 2 is to be positioned). Once the inserting body 40 has been arranged inside the tubular element 1, the filter 2 is pushed along the entire inserting body 40 by entering from the wider (larger) input end of the inserting body 40 and exiting from the narrower (smaller) output end of the inserting body 40: when the filter exits from the narrower (smaller) output end of the inserting body 40, it is inside the tubular element 1 in its final position, and as it expands due to spring-back (it is no longer radially compressed by the inserting body 40), it positions itself (stably) by interference inside the tubular element 1.

The inserting device 39 comprises a pushing element 41, which pushes the filter 2 along the entire inserting body 40 by entering from the wider (larger) input end of the inserting body 40 and exiting from the narrower (smaller) output end of the inserting body 40. According to a further embodiment, the pushing element 41 could enter from the wider (larger) input end of the inserting body 40 and arrive at the narrower (smaller) output end of the inserting body 40; in other words, in this embodiment, only the filter 2 comes out of the inserting body 4.

According to a preferred embodiment shown in the accompanying figures, the pushing element 41 causes the filter 2 to rotate on itself (i.e., it rotates the filter 2 around a longitudinal axis of rotation coaxial with the tubular element 1 and the inserting body 40). In particular, the pushing element 41 comprises a clamp 42 provided with two opposite jaws 43, which are closed against one another in order to grab one end of the filter 2; the two jaws 43 have an elongated shape (that is, a long and narrow shape), so as to be able to enter the inserting body 40 with a small amount of play. Moreover, the pushing element 41 comprises an actuator 44, which longitudinally translates the clamp 42 and, at the same time, rotates the clamp 42 around a longitudinal axis of rotation. According to a preferred embodiment, each filter 2 is grabbed by the clamp 42 with the outer portion 6 still extended (i.e., not wound around the inner portion 5 folded like the bellows of an accordion) and the rotation of the clamp 42 wraps the outer portion 6 of the filter 2 around the inner portion 5 folded like the bellows of an accordion; for this purpose, one end of the inserting body 40 is coupled to a fixed curved abutment, which causes the outer portion 6 of the filter 2 to be wound around the inner portion 5 folded like the bellows of an accordion before inserting the filter 2 inside the inserting body 40 (that is, the rotation of the clamp 42 brings the outer portion 6 of the filter 2 against the fixed curved abutment, which causes the outer portion 6 to fold).

As shown in FIG. 6, the manufacturing machine 8 comprises a folding drum 45, which is arranged vertically and is mounted so as to rotate, in a stepped manner, around a horizontal rotation axis 46 (parallel to the rotation axis 22); in other words, the folding drum 45 is driven into rotation with an intermittent motion, i.e., a non-continuous motion comprising a cyclic alternation of motion phases, in which the folding drum 45 is in motion, and rest phases, in which the folding drum 45 is still. The folding drum 45 supports four pockets 47, each suited for receiving a corresponding card stock sheet 4; according to a different embodiment, not shown, the folding drum 45 supports a different number of pockets 47, for example, three, five, six, eight . . . pockets 47.

Figure 14:
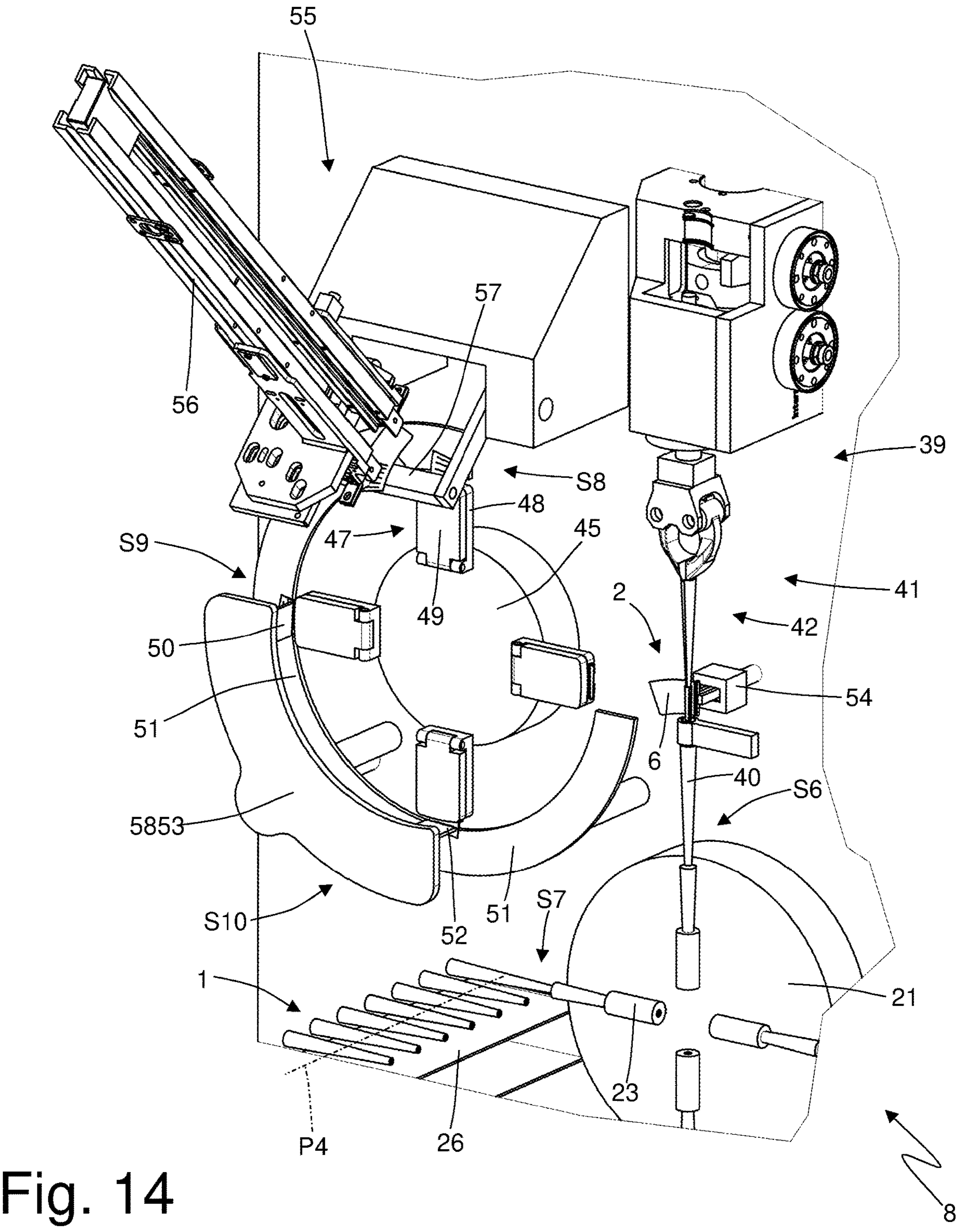
FIG. 14 is a perspective view, with parts removed for clarity, of the part in FIG. 13.

As shown in FIGS. 13 and 14, each pocket 47 is designed to hold a corresponding card stock sheet 4, by engaging the corresponding outer portion 6 and leaving the corresponding inner portion 5 free; that is, the inner portion 5 of the card stock sheet 4 juts out cantilevered from the pocket 47 and is folded like the bellows of an accordion. In particular, each pocket 47 has a fixed wall 48, which is integral with the folding drum 45, and a movable wall 49, which is hinged to the fixed wall 48 so as to rotate between an exchange position, in which the movable wall 49 is separate from the fixed wall 48 and, hence, does not hold a card stock sheet 4, and a movement position, in which the movable wall 49 is pressed against the fixed wall 48 in order to hold a card stock sheet 4.

As shown in FIG. 6, the rotation of the folding drum 45 around the rotation axis 46 cyclically moves each pocket 47 along a circular folding path P5 through: a feeding station S8 where the pocket 47 receives a card stock sheet 4, a folding station S9 where a movable folding element 50 locally folds an intermediate area of the inner portion 5 of the card stock sheet 4 into a "V" shape (so as to form a first "V" of the accordion) by pressing against a corresponding folding line 7 and by cooperating with a fixed striker (guide) 51, a folding station S10 where a movable folding element 52 (a twin of the movable folding element 50) locally folds an intermediate area of the card stock sheet 4 into a "V" shape (so as to form a second "V" of the accordion) by cooperating with the fixed striker 51, and the insertion station S6 where the filter 2 being formed (i.e., the card stock sheet 4 with the inner portion 5 folded like the bellows of an accordion) is released to the pushing element 41.

According to the embodiment shown in FIGS. 13 and 14, the two movable folding elements 50 and 52 of the two folding stations S9 and S10 are mounted in a same, common support plate 53 that can move axially (i.e., parallel to the rotation axis 46); in this way, a single actuation which axially translates the support plate 53 moves both movable folding elements 50 and 52 together. In addition, according to the embodiment shown in the accompanying figures, the removing tooth 37 is also mounted on the support plate 53 so as to exploit the same actuation of the two movable folding elements 50 and 52 of the two folding stations S9 and S10 (i.e., the linear actuator 38 of the removing tooth 37 integrates the support plate 53 and also operates the two movable folding elements 50 and 52 of the two folding stations S9 and S10).

In the embodiment shown in the accompanying figures, two twin and successive folding stations S9 and S10 are provided, in order to fold the inner portion 5 of the card stock sheet 4 into a "V" shape twice; according to other embodiments, not shown, the folding station S9 alone may be provided, in order to fold the inner portion 5 of the card stock sheet 4 into a "V" shape only once, or three or more folding stations S9/S10 may be provided, in order to fold the inner portion 5 of the card stock sheet 4 into a "V" shape three or more times.

In particular, a transferring member 54 is present (shown in FIGS. 13 and 14), which is arranged in the insertion station S6, picks up a filter 2 being formed (i.e., a card stock sheet 4 with the inner portion 5 folded like the bellows of an accordion) from a pocket 47 of the folding drum 45 and releases the filter 2 being formed to the pushing element 41 by making a short horizontal translation perpendicular to the rotation axis 46.

As shown in FIGS. 13 and 14, the manufacturing machine 8 comprises a feeding system 55 where a stack of card stock sheets 4 is housed in a hopper 56 inclined relative to the vertical direction; a transferring member 57 is provided and, by means of a rotary movement, cyclically moves a card stock sheet 4 from a pick-up opening arranged at the bottom of the hopper 56 to a pocket 47 standing still in the feeding station S8.

The operation of the manufacturing machine 1 is described below with reference to the manufacturing of a single tubular element 1.

As shown in FIG. 7, at first, the paper band 26 is unwound from the reel 29 and fed to the knife 31, which, by transversely cutting the paper band 26, separates a truncated-cone-shaped wrapping sheet 3 from the paper band 26; the wrapping sheet 3 is grabbed immediately before being cut from the gripping member 34, which, by translating, accompanies the wrapping sheet 3 above a pocket 11 in the feeding station S1; when the holding wall 12 is holding the wrapping sheet 3 through suction, the gripping member 34 releases the wrapping sheet 3, which translates again towards the knife 31 in order to grab a new wrapping sheet 3. Each pocket 11 arrives at the feeding station S1 when it is in the lowered movement position (i.e., axially closer to the input drum 9), and once it has reached the feeding station S1, the pocket 11 axially translates from the lowered movement position to the raised exchange position (i.e., axially farther from the input drum 9); when the pocket 11 is in the raised exchange position, it is also coplanar with the wrapping band 26 and therefore also with the wrapping sheet 3 separated from the wrapping band 26; thus, when the pocket 11 is in the raised exchange position, it can receive the wrapping sheet 3 from the gripping member 34. Once the pocket 11 has received the wrapping sheet 3 from the gripping member 34, the pocket 11 axially translates from the raised exchange position to the lowered movement position, and only once it has reached the lowered movement position can it rotate again together with the input drum 9 around the rotation axis 10, in order to move along the input path P1.

It is important to emphasize that the wrapping sheets 3 are alternately separated from the paper band 26 in two opposite directions (as shown in FIG. 2); accordingly, each pocket 11, when it reaches the feeding station S1, is rotated appropriately around the corresponding rotation axis 14 (when approaching the feeding station S1 or after reaching the feeding station S1) so as to be oriented consistently with the wrapping sheet 3 to be received by the pocket 11. That is, each pocket 11, when it reaches the feeding station S1, is rotated appropriately around the corresponding rotation axis 14 (when approaching the feeding station S1 or after reaching the feeding station S1) in order to have the same orientation as the wrapping sheet 3 to be received by the pocket 11. Subsequently, each pocket 11 rotates appropriately around the corresponding rotation axis 14 (when moving away from the feeding station S1 or when it is still in the feeding station S1) so that the wrapping sheet 3 carried by the pocket 11 is always arranged in a predetermined orientation, which is required for cooperation with the gluing device 35 in the gluing station S2 and with a corresponding spindle 18 of the wrapping drum 16 in the transfer station S3. In other words, the rotation of each pocket 11 around the corresponding rotation axis 14 is performed so that the wrapping sheets 3 received in the feeding station S1 in two opposite directions can always be oriented in the same way (as shown in FIG. 2).

Once the pocket 11 has received the wrapping sheet 3 in the feeding station S1, the rotation of the input drum 9 around the rotation axis 10 causes the pocket 11 to pass through (always moving) the gluing station S2 (i.e., without ever stopping in the gluing station S2), where the gluing device 35 deposits glue on one edge of the wrapping sheet 3; as stated above, as it passes through the gluing station S2, the pocket 11 rotates relative to the input drum 9 and around the rotation axis 14 to cause the glue sprayed by the gluing device 35 to be deposited in the desired position along one edge of the wrapping sheet 3. Once the pocket 11 has passed through the gluing station S2, the rotation of the input drum 9 around the rotation axis 10 brings the pocket 11 into the transfer station S3 where the pocket 11 stops; at the same time, the rotation of the wrapping drum 16 around the rotation axis 17 brings a spindle 18 into the transfer station S3 and above the pocket 11 which is still in the lowered movement position (i.e., axially closer to the input drum 9). At this point, the pocket 11 axially translates from the lowered movement position to the raised exchange position (i.e., axially farther from the input drum 9) to bring the wrapping sheet 3 into contact with the spindle 18 (as better shown in FIG. 8); in particular, the axial translation movement of the pocket 11 pushes the wrapping sheet 3 into the groove 13 of the holding wall 12 of the pocket 11 by virtue of the presence of the spindle 18, thus allowing the wrapping sheet 3 to be folded around the spindle 18 into a “U” shape (as shown in FIG. 8). During this step, the pocket 11 releases the wrapping sheet 3 by stopping its suction (which could also become a blow to move the wrapping sheet 3 away from the pocket 11), while at the same time the spindle 18 captures the wrapping sheet 3 by activating its suction.

After the wrapping sheet 3 has folded into a “U” shape around the spindle 18 in the transfer station S3 and as a result of the relative movement between the pocket 11 and the spindle 18, again in the transfer station S3, the folding element 19 associated with the spindle 18 moves (translates) from the waiting position (in which it was hitherto) to the folding position so as to fold a (glueless) edge of the wrapping sheet 3 folded into a “U” shape against the spindle 18 in order to continue the tubular wrapping of the wrapping sheet 3 around the spindle 18. After the folding action performed by the folding element 19, again in the transfer station S3, the folding element 20 associated with the spindle 18 moves (translates) from the waiting position (in which it was hitherto) to the folding position so as to fold the other edge (provided with the glue) of the wrapping sheet 3 folded into a “U” shape against the spindle 18 and over the edge previously folded by the folding element 19, in order to complete the tubular wrapping of the wrapping sheet 3 around the spindle 18 (i.e., to complete the formation of the tubular element 1). During this step, the edge provided with the glue folds over the previously folded (glueless) edge and then adheres to the previously folded (glueless) edge due to the action of the glue. According to a possible embodiment, the glue which is deposited by the gluing device 35 in the gluing station S2 is a hot glue which dries very quickly and reaches the transfer station S3 when it is already (at least partially) dry; consequently, the folding element 20 of each spindle 18 is heated (for example, by means of electrical resistors embedded in the folding element 20) to re-activate the previously deposited hot glue. That is, the folding element 20 heats the wrapping sheet 3 where the hot glue is, in order to re-activate the previously deposited hot glue. According to a different embodiment, the glue which is deposited by the gluing device 35 in the gluing station S2 reaches the transfer station S3 when it is not already (at least partially) dry and therefore the folding element 20 of each spindle 18 does not have to be heated.

As shown in FIGS. 10, 11 and 12, once the tubular element 1 has been formed (that is, once the wrapping sheet 3 has been wrapped into a tube around the spindle 18), the rotation of the wrapping drum 16 around the rotation axis 17 moves the spindle 18 carrying the tubular element 1 (that is, the wrapping sheet 3 folded into a tube) through the two stabilization stations S4, where the spindle 18 stops and the glue can stick adequately, thereby stabilizing the shape of the tubular element 1. During this movement, the two folding elements 19 and 20 both remain in the folding position in which they are substantially in contact with the spindle 18 (with the interposition of the tubular element 1) so as to prevent the wrapping sheet 3 constituting the tubular element 1 from losing its folded shape due to spring-back until the glue has stuck sufficiently well.

Then, the rotation of the wrapping drum 16 around the rotation axis 17 moves the spindle 18 carrying the tubular element 1 from the second stabilization station S4 to the transfer station S5; as soon as the spindle 18 carrying the tubular element 1 reaches the transfer station S5, the two folding elements 19 and 20 move (translate) from the folding position to the waiting position, thereby freeing the tubular element 1. At this point, a pocket 23 of the insertion drum 21 which has reached the transfer station S5 together with the spindle 18 and is in the movement position translates radially relative to the insertion drum 21 from the contracted movement position (shown in FIG. 10) to the expanded exchange position (shown in FIG. 12) so that it incorporates, on the inside, the tubular element 1 carried by the spindle 18, namely so that it inserts the tubular element 1 carried by the spindle 18 into its own central seat 24; at this point, the spindle 18 releases the tubular element 1 by stopping its suction (which could also become a blow to move the tubular element 1 away from the spindle 18), while at the same time the pocket 23 captures the tubular element 1 by activating its suction. Lastly, the pocket 23 of the insertion drum 21 translates radially relative to the insertion drum 21 from the expanded exchange position to the contracted movement position in order to remove the tubular element 1 (retained by suction inside the seat 24 of the pocket 23) from the spindle 18. According to a different embodiment, only the folding element 20 associated with the spindle 18 remains in the folding position up to the transfer station S5, whereas the folding element 19 associated with the spindle 18 moves (translates) from the folding position to the waiting position already in the transfer station S3 (obviously, after the folding element 20 has been moved to the folding position, completing the tubular wrapping of the wrapping sheet 3), or downstream of the transfer station S3 (for example, between the transfer station S3 and the first stabilization station S4 or in the first stabilization station S4).

Once the pocket 23 has picked up the tubular element 1 from the spindle 18 in the transfer station S5, the rotation of the insertion drum 21 around the rotation axis 18 moves the pocket 23 to the insertion station S6 where the pocket 23 stops. When the pocket 23 is stationary in the insertion station S6, the pocket 23 (which is in the movement position) translates radially relative to the insertion drum 21 from the contracted movement position (shown in FIG. 10) to the expanded exchange position (shown in FIG. 12) in order to be coupled to the inserting body 40; in this way, the inserting body 40 enters the seat 24 of the pocket 23 and therefore enters the tubular element 1 housed in the seat 24. At the same time, the pushing element 41 rotates and pushes a filter 2 along the entire inserting body 40 until the filter 2 comes out of the narrower (smaller) output end of the inserting body 40 (as described above) and the filter 2 is then positioned (stably) by interference inside the tubular element 1. When the insertion of the filter 2 inside the tubular element 1 is completed, the pocket 23 of the insertion drum 21 translates radially relative to the insertion drum 21 from the expanded exchange position to the contracted movement position in order to remove the tubular element 1 from the inserting body 40. Once the pocket 23 of the insertion drum 21 has returned to the contracted movement position, the rotation of the insertion drum 21 around the rotation axis 18 moves the pocket 23 from the insertion station S6 to the transfer station S7 where the pocket 23 stops. When the pocket 23 is stationary in the transfer station S7, the pocket 23 (which is in the movement position) translates radially relative to the insertion drum 21 from the contracted movement position (shown in FIG. 10) to the expanded exchange position (shown in FIG. 12 and in which the pocket 23 is exactly above the output conveyor 26); at this point, the removing tooth 37 is inserted into the slit 36 of the pocket 23, so that it is next to the wider end of the tubular element 1, and therefore the pocket 23 of the insertion drum 21 translates radially relative to the insertion drum 21 from the expanded exchange position to the contracted movement position: the presence of the removing tooth 37 prevents the tubular element 1 from following the translation of the pocket 23 and results in its removal from the pocket 23, thereby the tubular element 1 exits the pocket 23 and is located above the output conveyor 26. Simultaneously with the action of the removing tooth 37, the pocket 23 releases the tubular element 1 by stopping its suction (which could also become a blow to move the tubular element 1 away from the pocket 23).

The operation of the manufacturing machine 1 is described below with reference to the manufacturing of a single filter 2.

As shown in FIGS. 13 and 14, at first, a card stock sheet 4 is picked up from the bottom of the hopper 56 by the transferring member 57 (which is holding the card stock sheet 4 by suction) and is then inserted into a pocket 47 of the folding drum 45 which is stationary in the feeding station S8 and has the corresponding movable wall 49 in the exchange position (in which the movable wall 49 is separate from the fixed wall 48 and, hence, is not holding a card stock sheet 4). Once the transferring member 57 has inserted the outer portion 6 of the card stock sheet 4 into the pocket 47, the movable wall 49 of the pocket 47 is moved to the movement position (in which the movable wall 49 is pressed against the fixed wall 48 in order to hold the card stock sheet 4).

At this point, the rotation of the folding drum 45 around the rotation axis 46 moves the pocket 47 from the feeding station S8 to the folding station S9 where the pocket 47 stops; when the pocket 47 is stationary in the folding station S9, the movable folding element 50 folds the inner portion 5 of the card stock sheet 4 by 90° relative to the outer portion 6. Then, the rotation of the folding drum 45 around the rotation axis 46 moves the pocket 47 from the folding station S9 to the insertion station S6, passing through the folding station S10; while passing through the folding station S10, the fixed folding element 51 folds the inner portion 5 of the card stock sheet 4 like the bellows of an accordion. When the pocket 47 is stationary in the insertion station S6, the movable wall 49 of the pocket 47 is moved from the movement position to the exchange position to allow the transferring member 54 to pick up the partially folded card stock sheet 4 (i.e., with the inner portion 5 folded like the bellows of an accordion) from the pocket 47 and feed the partially folded card stock sheet 4 to the clamp 42 of the pushing element 41, which grabs with its jaws 43 the inner portion 5 folded like the bellows of an accordion.

As stated above, the filter 2 (consisting of the folded card stock sheet 4) is grabbed by the clamp 42 with the outer portion 6 still extended (i.e., not wound around the inner portion 5 folded like the bellows of an accordion) and the rotation of the clamp 42 wraps the outer portion 6 of the filter 2 around the inner portion 5 folded like the bellows of an accordion. According to a different embodiment, the filters 2 are not formed by folding the card stock sheets 4 but are picked up already formed from a hopper or from another type of magazine; in this case, the folding drum 45 is not present and is replaced by a feeder which picks up the filters 2 from the hopper or from another type of magazine and delivers them to the clamp 42 of the pushing element 41. In this embodiment, the filters 2 may be of a different type with respect to a card stock sheet 4 folded on itself and, for example, may consist of acetate fibres closed in a paper strap folded into a tube.

According to a further embodiment, the tubular element 1 does not comprise the filter 2, i.e., no filter 2 is inserted into the tubular element 1.

According to a further embodiment, the manufacturing machine 8 also comprises a filling drum (for example, interposed between the insertion drum 21 and the output conveyor 26) where powdered tobacco or another type of smoking material is fed into the tubular element 1.

In the embodiment shown in the accompanying figures, the pockets 11, 23 and 47 and the spindles 18 are fed along the respective paths P1, P2, P3 and P5 by rotary conveyors (the drums 9, 21, 45 and 16); according to a different embodiment, not shown, some or all of the rotary conveyors (the drums 9, 21, 45 and 16) which feed the pockets 11, 23 and 47 and the spindles 18 are replaced by corresponding linear conveyors (therefore, the respective paths P1, P2, P3 and P5 are no longer circular but linear).

In the embodiment described above, the tubular element 1 has a truncated-cone shape (i.e., with a cross-section increasing progressively moving away from the filter 2); according to a different embodiment, not shown, the tubular element 1 has a cylindrical shape (i.e., a constant cross-section along its entire extension). Obviously, in this embodiment too, the filter 2 may be shaped differently or be absent.

In the embodiment shown in the accompanying figures, the tubular element 1 is intended for the manual production of a cigarette; according to a different embodiment, the tubular element 1 (obviously without the filter 2 and with a truncated-cone or cylindrical shape) has a different final purpose, for example, it could constitute a drinking straw (i.e., a straw for sipping a beverage). Obviously, in order to make a drinking straw, the wrapping sheet 3 must be made of paper made sufficiently waterproof or of another material which is waterproof.

The embodiments described herein may be combined with each other without departing from the scope of protection of the present invention.

The manufacturing machine 8 described above has many advantages.

Firstly, the above-described manufacturing machine 8 allows high hourly productivity (the nominal hourly productivity of the manufacturing machine 8 is in the order of 200-300 tubular elements 1 per minute), while ensuring high quality standards (i.e., ensuring the formation of tubular elements 1 with a perfect shape, without more or less accentuated squashing or deformation). This result is obtained, among other things, thanks to a particularly gentle but at the same time very effective and efficient treatment of the wrapping sheets 3, which are never excessively mechanically stressed and at the same time always have a known and certain position.

Moreover, the manufacturing machine 8 is particularly compact and allows an operator who is close to the manufacturing machine 8 to reach with his/her own hands all the various parts of the manufacturing machine 8, without having to make unnatural movements.

Finally, the manufacturing machine 8 is relatively simple and inexpensive to implement.

The invention claimed is:

1. A manufacturing machine (8) for the production of a tubular element (1) for a smoking article; the manufacturing machine (8) comprises:

- an input conveyor (9), which moves at least one first pocket (11) along an input path (P1);
- a wrapping conveyor (16), which moves at least one spindle (18), which has the shape of an inner cavity of the tubular element (1), along a wrapping path (P2);
- a feeding station (S1), where the first pocket (11) receives a wrapping sheet (3); and
- a first transfer station (S3), where the first pocket (11) releases the wrapping sheet (3) to the spindle (18) folding the wrapping sheet (3) around the spindle (18) into a "U" shape;
- wherein the first pocket (11) has a holding wall (12), which is designed to hold the wrapping sheet (3) through suction and has, at the center, a groove (13), which reproduces in negative the shape of the tubular element (1); and
- wherein a relative movement between the first pocket (11) and the spindle (18) is caused in the first transfer station (S3), wherein the spindle (18) pushes the wrapping sheet (3) into the groove (13) of the holding wall (12), thus allowing the wrapping sheet (3) to be folded around the spindle (18) into a "U" shape.

2. The manufacturing machine (8) according to claim 1, wherein:

- the spindle (18) has a plurality of small holes, which can be connected to a suction source in order to hold the wrapping sheet (3) and can be connected to a compressed air source in order to push the wrapping sheet (3) away; and
- the small holes of the spindle (18) are inclined towards a base of the spindle (18) so that, when they are connected to the compressed air source, they also generate an axial thrust, which tends to remove the tubular element (1) from the spindle (18).

3. The manufacturing machine (8) according to claim 1, wherein:

- the spindle (18) is mounted in a fixed position on the wrapping conveyor (16);
- the first pocket (11) is mounted on the input conveyor (9) in a movable manner;
- a first actuator (15) is provided, which translates the first pocket (11) relative to the input conveyor (9) in the first transfer station (S3), at first, in order to push the wrapping sheet (3) against the spindle (18), thus allowing the wrapping sheet (3) to enter the groove (13) of the holding wall (12) and, at the same time, allowing the wrapping sheet (3) to be folded around the spindle (18) into a “U” shape, and, subsequently, in order to move the first pocket (11) away from the spindle (18) holding the wrapping sheet (3).

4. The manufacturing machine (8) according to claim 1, wherein the wrapping conveyor (16) supports two folding elements (19, 20), which are arranged on opposite sides of the spindle (18) and are movable independently of one another relative to the spindle (18) so as to move between a waiting position, in which the folding elements (19, 20) are farther from the spindle (18), and a folding position, in which the folding elements (19, 20) are closer to the spindle (18).

5. The manufacturing machine (8) according to claim 4, wherein, after the wrapping sheet (3) has been folded around the spindle (18) into a “U” shape, a first folding element (19) moves from the waiting position to the folding position so as to fold a first edge of the “U” folded wrapping sheet (3) against the spindle (18) and, subsequently, a second folding element (20) moves from the waiting position to the folding position so as to fold a second edge of the “U” folded wrapping sheet (3) against the spindle (18) and on top of the first edge, which was previously folded by the first folding element (19), in order to complete the tubular wrapping of the wrapping sheet (3) around the spindle (18), thus forming the tubular element (1).

6. The manufacturing machine (8) according to claim 5, wherein the first edge of the wrapping sheet (3) and/or the second edge of the wrapping sheet (3) are provided with a glue.

7. The manufacturing machine according to claim 6, wherein the second edge of the wrapping sheet (3) is provided with a glue, whereas the first edge of the wrapping sheet (3) has no glue.

8. The manufacturing machine (8) according to claim 5, wherein the second folding element (20) is heated so as to re-activate a glue interposed between the first edge of the wrapping sheet (3) and the second edge of the wrapping sheet (3) and is kept in contact with the spindle (18) up to a second transfer station (S5), where the tubular element (1) is axially removed from the spindle (18).

9. The manufacturing machine (8) according to claim 1 and comprising a gluing station (S2), which is arranged along the input path (P1) between the feeding station (S1) and the first transfer station (S3) and is provided with a gluing device (35), which is designed to apply a glue to the wrapping sheet (3) carried by the first pocket (11).

10. The manufacturing machine (8) according to claim 1 and comprising a feeding system (27), which, in the area of the input station (S1), separates the wrapping sheet (3) from a wrapping material band (28) by means of a transverse cut.

11. The manufacturing machine (8) according to claim 10, wherein:

the tubular element (1) has the shape of a truncated cone;

the wrapping sheet (3) has a trapezoid shape;

the feeding system (27) cyclically varies an orientation of the transverse cut in order to separate the wrapping sheets (3) from the wrapping material band (28) without waste; and the first pocket (11) is mounted on the input conveyor (9) in a rotary manner so as to be suited to receive the wrapping sheet (3) in the input station (S1) with two different orientations and so as to always place the wrapping sheet (3) in the first transfer station (S3) with the same orientation.

12. The manufacturing machine (8) according to claim 11, wherein the feeding system (27) comprises:

a knife (31);

a second actuator (32), which cyclically moves the knife (31) perpendicularly to the paper band (28) so as to cut the paper band (28); and a third actuator (33), which, between one cut and the other, changes the inclination of the knife (31) relative to the paper band (28) by rotating the knife (31) around a rotation axis which is perpendicular to the lying plane of the paper band (28).

13. The manufacturing machine (8) according to claim 1 and comprising:

an insertion conveyor (21), which moves at least one second pocket (23) along an insertion path (P3), said second pocket (23) having a tubular shape and having, on the inside, a seat (24), which reproduces in negative the shape of the tubular element (1) and is designed to receive the tubular element (1); and a second transfer station (S5), where the tubular element (1) is released by the spindle (18) to the second pocket (23).

14. The manufacturing machine (8) according to claim 13, wherein:

the second pocket (23) is mounted on the insertion conveyor (21) in a movable manner so as to radially translate, relative to the insertion conveyor (21), between an expanded exchange position, in which the pocket (23) receives and releases the tubular element (1), and a contracted movement position; and in the second transfer station (S5), when the second pocket (23) moves from the movement position to the exchange position, the second pocket (23) incorporates, on the inside, the tubular element (1) carried by the spindle (18), namely it inserts the tubular element (1) carried by the spindle (18) into its own central seat (24).

15. A manufacturing method for the production of a tubular element (1) for a smoking article; the manufacturing method comprises the steps of:

moving, by means of an input conveyor (9), at least one pocket (11) along an input path (P1);

moving, by means of a wrapping conveyor (16), at least one spindle (18), which has the shape of an inner cavity of the tubular element (1), along a wrapping path (P2);

feeding, in a feeding station (S1), a wrapping sheet (3) to the pocket (11); and releasing, in a transfer station (S3), the wrapping sheet (3) from the pocket (11) to the spindle (18) folding the wrapping sheet (3) around the spindle (18) into a “U” shape;

wherein the first pocket (11) has a holding wall (12), which is designed to hold the wrapping sheet (3) through suction and has, at the center, a groove (13), which reproduces in negative the shape of the tubular element (1); and wherein a relative movement between the first pocket (11) and the spindle (18) is caused in the first transfer station (S3), wherein the spindle (18) pushes the wrapping sheet (3) into the groove (13) of the holding wall (12), thus allowing the wrapping sheet (3) to be folded around the spindle (18) into a “U” shape.

* * * * *